United States Patent
Yanagisawa et al.

(10) Patent No.: US 12,458,047 B2
(45) Date of Patent: Nov. 4, 2025

(54) VEGETABLE MILK FERMENTED FOOD PRODUCT, AND METHOD FOR MANUFACTURING SAME

(71) Applicant: FUJI OIL HOLDINGS INC., Osaka (JP)

(72) Inventors: Masanobu Yanagisawa, Sakai (JP); Naoya Ikenaga, Wakayama (JP)

(73) Assignee: FUJI OIL CO., LTD., Osaka (JP)

( * ) Notice: Subject to any disclaimer, the term of this patent is extended or adjusted under 35 U.S.C. 154(b) by 347 days.

(21) Appl. No.: 17/913,230

(22) PCT Filed: Mar. 26, 2021

(86) PCT No.: PCT/JP2021/012766
§ 371 (c)(1),
(2) Date: Sep. 21, 2022

(87) PCT Pub. No.: WO2021/193891
PCT Pub. Date: Sep. 30, 2021

(65) Prior Publication Data
US 2023/0337705 A1    Oct. 26, 2023

(30) Foreign Application Priority Data

Mar. 26, 2020   (JP) ................................ 2020-055397

(51) Int. Cl.
*A23L 11/50* (2021.01)
*A23L 11/65* (2025.01)
*A23L 29/30* (2016.01)

(52) U.S. Cl.
CPC ............... *A23L 11/50* (2021.01); *A23L 11/65* (2021.01); *A23L 29/30* (2016.08)

(58) Field of Classification Search
CPC .. C12Y 302/01022; A23L 11/33; A23L 11/65; A23L 11/37; A23C 11/106
See application file for complete search history.

(56) References Cited

FOREIGN PATENT DOCUMENTS

| | | |
|---|---|---|
| CN | 100 566 595 | 12/2009 |
| CN | 104222299 | 12/2014 |
| EP | 0 386 817 | 5/1993 |
| EP | 1 145 648 | 10/2001 |
| JP | 61-139354 | 6/1986 |
| JP | 2001-346521 | 12/2001 |
| JP | 2007-14303 | 1/2007 |
| WO | 2008/003782 | 1/2008 |

OTHER PUBLICATIONS

Bharathi "Functional effects of soy-raffinose on the quality parameters of yogurt", thesis, University of Central Oklahoma, 2019 (Year: 2019).*
International Search Report issued Jun. 8, 2021 in International (PCT) Application No. PCT/JP2021/012766.
International Preliminary Report on Patentability issued Sep. 22, 2022 in International (PCT) Application No. PCT/JP2021/012766.
Extended European Search Report issued Feb. 23, 2024 in corresponding European Patent Application No. 21775413.4, pp. 1-12.
Faridah D.N. et al., "Oligosaccharide Content and in vitro Protein Digestibility of Twenty Commercial Soy-Based Powder Drinks in Indonesia", Asian Journal of Chemistry, vol. 26, No. 22, Nov. 6, 2014, pp. 7687-7692.
Donkor et al., "α-Galactosidase and proteolytic activities of selected probiotic and dairy cultures in fermented soymilk", Food Chemistry, vol. 104, No. 1, 2007, pp. 10-20.
Castro-Bravo Nuria et al., "Interactions of Surface Exopolysaccharides From Bifidobacterium and Lactobacillus Within the Intestinal Environment", Frontiers in Microbiology, vol. 9, Article 2426, Oct. 11, 2018, pp. 1-15.

* cited by examiner

*Primary Examiner* — Michele L Jacobson
(74) *Attorney, Agent, or Firm* — Wenderoth, Lind & Ponack, L.L.P.

(57) ABSTRACT

The purpose of the present invention is to provide a vegetable milk fermented food product having a creamy mouthfeel and having the same smoothness as yogurt, the vegetable milk fermented food product being such that it is possible to user EPS-producing bacteria of a wider variety of types irrespective of whether said bacteria have α-galactosidase activity. A method for manufacturing a vegetable milk fermented food product by inoculating a vegetable-milk-containing fermented raw material with lactic acid bacteria and prompting lactic acid fermentation to occur, wherein the method for manufacturing a vegetable milk fermented food product is characterized in comprising: A) a decomposition step in which α-galactosidase is caused to act on vegetable milk to which a saccharide including galactose bonded by an α-glycoside bond has been added as a constituent sugar, or on vegetable milk containing said saccharide, and the saccharide is hydrolyzed; and B) a fermentation step, performed after or simultaneously with the decomposition step, in which the hydrolyzed saccharide is fermented by lactic acid bacteria having extracellular-polysaccharide-producing capabilities.

15 Claims, No Drawings

VEGETABLE MILK FERMENTED FOOD PRODUCT, AND METHOD FOR MANUFACTURING SAME

TECHNICAL FIELD

The present invention relates to a method for producing a fermented plant-based milk food.

BACKGROUND ART

The motion of taking in plant-based milk represented by soymilk as a substitute for milk is enlarged because of, for example, climate change represented by global warming; expansion of influence to buying interest by the generation after Millennials who have high environmental consciousness; consciousness of animal protection; and health problems such as the accumulation of cholesterol due to animal protein.

The above-mentioned tendency is also spread on not only milk but also processed food using milk such as yogurt, and for example, a fermented soymilk food obtained by fermenting soymilk with lactic acid bacterium is known.

Regarding as the milk, extracellular polysaccharide (EPS) secreted by lactic acid bacterium have been detected from traditional fermented products. The main constituent sugars of the EPS are galactose, glucose, and mannose. EPS has various health functions such as immunomodulation activity, and further has, for example, a function of imparting creamy texture to yoghurt, and a function of stabilizer.

However, there is a problem that it is difficult to produce the extracellular polysaccharides by fermentation of plant-based milk even if the same lactic acid bacterium as the case of milk is used since the plant-based milk contains lower amount of sugar containing galactose as a constituent sugar such as lactose as compared with the milk. In addition, it is difficult to use galactose as a raw material for producing food since the galactose of the monosaccharide is available as a reagent only.

As a method for solving the above-mentioned problem, a method of fermenting soymilk added with sucrose, maltose, stachyose, or raffinose, with a selected specific *Leuconostoc* lactic acid bacterium such as *Leuconostoc pseudomesenteroides* is disclosed (Patent Document 1).

PRIOR ART DOCUMENTS

Patent Documents

Patent Document 1: JP 2007-14303 A

SUMMARY OF INVENTION

Problems to be Solved by Invention

Plant-based milk does not contain lactose, which is different from milk, and thus it is necessary to use lactic acid bacterium having α-glucosidase activity to produce EPS. Many lactic acid bacteria having an EPS-producing ability to be used for yogurt of dairy products have β-glucosidase that decomposes lactose, and thus the EPS cannot be produced even if the plant-based milk is fermented with them. Therefore, the technique of Patent Document 1 has a problem that lactic acid bacterium that can be used are limited because only a lactic acid bacterium having α-galactosidase activity can produce EPS by decomposing saccharides having galactose as a constituent sugar such as raffinose.

An object of the present invention is to provide a fermented plant-based milk food having a smooth and creamy texture similar to that of yogurt by using a wide variety of EPS-producing bacteria regardless of the presence or absence of the α-galactosidase activity.

Means for Solving Problems

The present inventors have intensively studied to solve the above-mentioned problems. They have obtained plant-based milk containing free galactose by decomposing sugars containing galactose bound with α-glycosidic bond as a constituent sugar in the plant-based milk with α-galactosidase before lactic acid fermentation of the plant-based milk to produce galactose. Then, the obtained plant-based milk has been fermented with various lactic acid bacteria having EPS-producing ability. As a result, they have found that there is a difference in the texture of the fermented plant-based milk food in the presence or absence of the action of α-galactosidase. The present invention has been completed based on these findings.

That is, the present invention relates to:
(1) a method for producing a fermented plant-based milk food including inoculating a lactic acid bacterium into a fermentation raw material containing a plant-based milk and subjecting the plant-based milk to lactic acid fermentation, the method including:
(A) a decomposition step including hydrolyzing a sugar containing galactose bound with α-glycosidic bond as a constituent sugar in the plant-based milk with α-galactosidase by acting α-galactosidase on the plant-based milk containing the sugar, where the plant-based milk naturally contains the sugar or are prepared by adding the sugar; and
(B) a fermentation step including fermenting the hydrolyzed plant-based milk with lactic acid bacterium having extracellular polysaccharide-producing ability after the decomposition step or together with the decomposition step;
(2) the method for producing a fermented plant-based milk food of (1), where the decomposition step is performed by fermentation with a microorganism having α-galactosidase activity;
(3) the method for producing a fermented plant-based milk food of (1), where the decomposition step is performed with an enzyme having α-galactosidase activity;
(4) the method for producing a fermented plant-based milk food of any one of (1) to (3), further including a pasteurization step prior to the fermentation step (B) and after the decomposition step (A);
(5) the method for producing a fermented plant-based milk food of any one of (1) to (4), where the sugar containing galactose as a constituent sugar is raffinose or stachyose;
(6) the method for producing a fermented plant-based milk food of any one of (1) to (5), where the plant-based milk is a bean milk;
(7) a method for producing a plant-based milk for a fermentation raw material using a lactic acid bacterium having an extracellular polysaccharide-producing ability, including hydrolyzing a sugar containing galactose bound with α-glycosidic bond as a constituent sugar in the plant-based milk with α-galactosidase by acting α-galactosidase on the plant-based milk containing the sugar, and then subjecting the plant-based milk to a pasteurization, where the plant-based milk naturally contains the sugar or are prepared by adding the sugar;

(8) the method of (7), where the hydrolysis is performed by fermentation with a microorganism having α-galactosidase activity;

(9) the method of (7), where the hydrolysis is performed by treating with an enzyme having α-galactosidase activity;

(10) the method for producing a plant-based milk of any one of (7) to (9), where the sugar containing galactose as a constituent sugar is raffinose or stachyose;

(11) the method for producing a plant-based milk of any one of (7) to (10), where the plant-based milk is a bean milk.

Effects of Invention

The present invention enables to use a wide range of EPS-producing bacteria for lactic acid fermentation of plant-based milk as a raw material. And, a fermented plant-based milk food having a smooth and creamy texture similar to yoghurt may be obtained by the EPS produced by the fermentation. In addition, the present invention enables to provide plant-based milk for a fermentation raw material, for preparing a fermented plant-based milk food having smooth and creamy texture simply by fermenting with various lactic acid bacteria having EPS-producing ability.

MODE FOR CARRYING OUT INVENTION

Hereinafter, embodiments of the present invention will be described in detail.

Fermented Plant-Based Milk Food

A fermented plant-based milk food in the present invention is obtained by lactic fermentation of milk (emulsion-like liquid) obtained from a plant-based raw material as a basic raw material. The product form may be a yoghurt-like or cheese-like product, such as solid, pasty and liquid.

Fermentation Raw Material

Plant-Based Milk

Plant-based milk in the present invention is milk (emulsion liquid) obtained from a vegetable raw material as a basic raw material. The vegetable raw material is not limited as long as it is a vegetable, and specific examples thereof include beans such as soybean, pea and broad bean; seeds such as almond, cashew nut, walnut, peanut and pistachio; and grains such as rice and oat. They may be used in combination at appropriate ratio. The plant-based milk may contain a fiber component of the plant-based raw material.

Bean Milk

Bean milk in the present invention is milk (emulsion liquid) obtained from a bean as a basic raw material among vegetable raw materials. Typical example of the bean is soybean, and their varieties include yellow soybean, blue soybean and black soybean. In consideration of a nutrient function of components contained in soybean, a soybean in which specific components of soybean, such as 7S globulin, 11S globulin, isoflavone, saponin, nicotianamine, lecithin, oligosaccharide, vitamin and mineral, are enriched by, for example, breeding, gene manipulation, or germination treatment, may be used. Examples of the beans other than soybean include red bean, kidney bean, black-eyed pea, scarlet runner bean, pea, broad bean, ricebean, lentil bean, pinto bean, lima bean, chickpea and goober pea. These may be used in combination at appropriate ratio. The bean may include an outer skin and a hypocotyl portion, but those which have been removed may also be used.

Sugar Containing Galactose Bound with α-Glycosidic Bond as a Constituent Sugar

In the present invention, plant-based milk is provided by adding a sugar containing galactose bound with α-glycosidic bond as a constituent sugar, or plant-based milk naturally containing the sugar is provided.

The sugar containing galactose bound with α-glycosidic bond as a constituent sugar in the present invention is a sugar which is hydrolyzed by α-galactosidase to produce galactose. The sugar may be a disaccharide or more oligosaccharide, and may be disaccharide, trisaccharide, tetrasaccharide or more. Specific examples thereof include raffinose, melibiose, stachyose and galactomannan. The sugar may be originally included in plant-based milk or may be separately added to plant-based milk, or both. In addition, lactose and galactooligosaccharide are out of the present invention because these are bound to galactose with β-glycosyl bond.

A content of the sugar in the plant-based milk to be subjected to the hydrolysis is not particularly limited, specifically, 0.1 to 10% by weight, preferably 0.5 to 7% by weight, more preferably 0.5 to 5% by weight, and further preferably 0.5 to 3% by weight.

Hydrolysis Step

Hydrolysis of the sugar in the present invention is performed with α-galactosidase. A method of hydrolysis is not particularly limited, and specific examples thereof include an enzyme treatment with adding α-galactosidase and a fermentation with a microorganism having α-galactosidase activity.

Enzyme Treatment

In the case of enzyme treatment by addition of α-galactosidase, an origin of the α-galactosidase is not limited, but it is preferable that a protease activity is low. When the protease activity is high, protein is decomposed during hydrolysis and bitter taste may be produced.

An activity of α-galactosidase may be 5000 GalU or more, preferably 10000 GalU or more, more preferably 30000 GalU or more. The activity of 1 GalU shows an activity as an amount of enzyme that releases p-nitrophenol by hydrolyzing p-nitrophenyl-α-D-galactopyranoside at a rate of 1 μmol per 1 minute under conditions of pH 5.5 and 37° C. (as defined by FCCVIII).

Appropriate protease activity is 50000 PUN or less, preferably 30000 PUN or less, and more preferably 10000 PUN or less. The activity of 1 PUN shows an activity of releasing a TCA-soluble component corresponding to 1 μg of tyrosine with Folin reagent per 1 minute when 1 ml of the enzyme solution is added to 5 ml of 0.6% milk casein (pH 7.5, M/25 phosphate buffer) and allowing it to react at 30° C. for 10 minutes.

Conditions for hydrolysis with α-galactosidase are not particularly limited, but are preferably carried out at optimum temperature and optimum pH for α-galactosidase. Specifically, it is 20 to 80° C., preferably 40 to 80° C., more preferably 50 to 70° C., and further preferably 60 to 70° C.

After the hydrolysis, an α-galactosidase inactivation step may be added as necessary. Inactivation conditions are not particularly limited as long as a temperature is at or above temperature at which α-galactosidase is inactivated.

Fermentation by Microorganism

In the case of fermentation by a microorganism having α-galactosidase activity, fermentation is performed by inoculating a microorganism having α-galactosidase activity to plant-based milk containing sugar containing galactose as a constituent sugar.

As a nutrient source for microorganism, it is not essential to add assimilable sugar other than the sugar containing galactose as a constituent sugar. The assimilable sugar may be added when fermentation is difficult to proceed. For example, glucose, fructose, sucrose, maltose, trehalose, fructo-oligosaccharide, and xylooligosaccharide may be used. These sugar raw materials may be used alone or in combination of two or more. An amount of the assimilable sugar added is suitably 1 to 50% by weight, preferably 5 to 40% by weight, based on a solid content of fermentation raw material.

Optionally, raw material such as starch, thickening polysaccharide, gelling agent, emulsifier, flavor, acidulant, antioxidant, and chelating agent may be appropriately added other than the assimilable sugar.

The microorganism in the present invention is not particularly limited as long as it has α-galactosidase activity. For example, lactic acid bacterium, bifidobacterium, yeast, and koji mold may be used alone or in combination.

Examples of lactic acid bacterium having α-galactosidase activity include *Lactobacillus plantarum, Lactobacillus reuteri, Lactobacillus helveticus, Lactobacillus fermentum, Lactobacillus acidophilus, Lactococcus lactis*, and *Leuconostoc mesenteroides*.

Examples of bifidobacterium having α-galactosidase activity include *Bifidobacterium breve*, and *Bifidobacterium longum*.

Examples of yeast having α-galactosidase activity include *Candida javanica, Candida guilliermondii, Debaryomyces hansenii, Saccharomyces cerevisiae*, and *Gibberella fujikuroi*.

Examples of koji mold having α-galactosidase activity include *Aspergillus flavipes, Aspergillus oryzae, Aspergillus ficuum, Aspergillus nidulans, Penicillium chrysogenum*, and *Thermomyces lanuginosus*. A presence or absence of α-galactosidase activity may be different depending on the type of strain even in the same bacterial species.

Fermentation conditions are not particularly limited because these are different depending on the type of microorganisms to be used. For example, in the case of fermentation by lactic acid bacterium, temperature may be 10 to 50° C., preferably 15 to 45° C., more preferably 20 to 35° C., and further preferably 20 to 30° C. For example, fermentation time may be 0.5 to 72 hours, and preferably 1 to 5 hours.

Fermentation may be carried out until a decrease in pH from starting fermentation is 4 or less, preferably 2 or less, more preferably 1 or less, and further preferably 0.5 or less. When the decrease in pH from starting fermentation is large, it is also possible to finely adjust the pH to a desired pH by alkali, organic acid, or inorganic acid.

In a certain aspect, after the hydrolysis step and before the next lactic acid fermentation step, a homogenization step or a heat pasteurization step may be optionally performed. Examples of heat pasteurization conditions include a temperature at which bacterium is killed. In one aspect, the plant-based milk obtained as described above may be provided to a person skilled in the art as a raw material for fermentation by lactic acid bacterium capable of producing extracellular polysaccharides, for example, by aseptically filling into a sealed container as necessary.

Lactic Acid Fermentation Step

A lactic acid fermentation step of the present invention is a fermentation step of fermenting the hydrolyzed plant-based milk with lactic acid bacterium (EPS-producing lactic acid bacterium) having an ability to produce Extracellular polysaccharides (EPS) after the hydrolysis step or together with the hydrolysis step.

That is, in a certain aspect, the plant-based milk subjected to the hydrolysis step is fermented with an EPS-producing lactic acid bacterium. In another aspect, the above hydrolysis step and the fermentation step with the EPS-producing lactic acid bacterium are performed to the plant-based milk.

The EPS-producing lactic acid bacterium in the present invention is not particularly limited as long as it is a bacterial species that produces an EPS having galactose as a constituent sugar by fermentation. It is preferable that the lactic acid bacterium is added so that the amount of the lactic acid bacterium is 10 to the 5 to 7th power at the initial bacterial count level, and it is preferable that an adding amount of the lactic acid bacterium is 10 to the 6th power. In the case of powder or solid starter, 0.001 to 15% by weight, preferably 1 to 10% by weight, of the raw material is suitable.

Examples of bacterial species of the EPS-producing lactic acid bacterium include *Lactobacillus bulgaricus, Lactobacillus johnsonii, Lactobacillus plantarum, Lactobacillus delbrueckii, Lactobacillus helveticus, Lactobacillus paracasei, Streptococcus thermophilus*, and *Lactococcus lactis*. A presence or absence of EPS-producing activity may be different depending on the type of strain even in the same bacterial species.

Examples of the aspect of performing the fermentation step with EPS-producing lactic acid bacterium together with the hydrolysis step of plant-based milk include a method of adding lactic acid bacterium having both α-galactosidase activity and EPS-producing ability to plant-based milk, a method of adding α-galactosidase enzyme and EPS-producing lactic acid bacterium to plant-based milk, and a method of adding EPS lactic acid bacterium to plant-based milk together with lactic acid bacterium, yeast, or koji mold, which has α-galactosidase activity.

As a fermentation raw material, it is not essential to add assimilable sugar as a nutrient source for lactic acid bacterium. The assimilable sugar may be added when fermentation is difficult to proceed. For example, glucose, fructose, sucrose, maltose, lactose, raffinose, trehalose, soybean oligosaccharide, fructo-oligosaccharide, and xylooligosaccharide may be used. These sugar raw materials may be used alone or in combination of two or more. An amount of the assimilable sugar added is suitably 1 to 50% by weight, preferably 5 to 40% by weight, based on a solid content of fermentation raw material.

Optionally, raw material such as plant-based milk, powdered vegetable protein, starch, thickening polysaccharide, gelling agent, emulsifier, flavor, acidulant, antioxidant, and chelating agent may be appropriately added other than the assimilable sugar.

Conditions of the lactic acid fermentation may be appropriately changed depending on the type of lactic acid bacterium to be used. For example, fermentation temperature may be 10 to 50° C., preferably 15 to 45° C. For example, fermentation time may be 4 to 72 hours, and preferably 5 to 60 hours. Lactic acid fermentation may be carried out until the pH of the fermentation raw material is 3 to 6, if necessary 3 to 5. It is also possible to finely adjust the pH to a desired pH by alkali, organic acid, or inorganic acid after the fermentation. The fermentation may be performed by a device similar to that used in producing yogurt or cheese from milk.

Step after Lactic Acid Fermentation

Optionally, conventional steps such as homogenization step and heat pasteurization step may be performed after the lactic acid fermentation to produce a yoghurt-like product having solid form, paste form, or liquid form. In addition, a cheese-like product having solid form or paste form may also be produced through conventional steps.

Food and Beverage

The fermented plant-based milk food of the present invention may be used as a raw material for producing various foods and beverages.

A form of the foods and beverages is not particularly limited, and examples of the form include plant-based milk such as soymilk, beverage such as soft drink, unbaked confectionery such as pudding, bavarois, jelly, whipped cream, and filling, fermented food such as yoghurt, cheese, and fermented beverage, Japanese confectionery such as rice dumpling, and steamed bun, puffed food such as snack, bakery food such as biscuit, cookie, and bread, dip such as chocolate, margarine, butter, spread, and mayonnaise, sauce, soup, deep-fried food, fishery paste product, meat product such as poultry, livestock meat, and fish meat. In some aspects, the foods and beverages are preferably composed of plant-based ingredients. In some aspects, the foods and beverages may be plant-based butter, margarine, and whipped cream.

In the production of the various products, necessary food raw material such as fruit juice, fruit pulp, vegetable, sugar, fat, dairy product, grain flour, starch, cacao mass, poultry, livestock meat, and fish meat, and food additive such as mineral, vitamin, emulsifier, thickening stabilizer, acidulant, and flavor, may be used as appropriate in addition to plant-based fermented milk.

EXAMPLES

The details of the present invention will be explained more specifically by showing the following Examples. In the Examples, "part" and "%" are weight basis.

Comparative Example 1

A mixed liquid was prepared by mixing 54.5 parts of "soymilk cream" (manufactured by Fuji Oil Co., Ltd., total solid content: 19.8%, protein content: 5.6%, lipid content: 12.3%) as plant-based milk, 1 part of glucose, 0.8 part of oligosaccharide containing galactose as constituent sugar "Hokkaido beet oligosaccharide" (manufactured by Nippon Garlic Corporation, raffinose: 98%, sucrose: 2%), and 43.6 parts of water to make 99.9 parts. To the mixed liquid, 0.1 part of frozen pellet of *Streptococcus thermophiles* having EPS-producing ability as a lactic acid bacterium was added, and lactic acid fermentation was performed at 42° C. until the pH decreased to 4.6 to obtain a fermented plant-based milk food. Raffinose is a trisaccharide composed of galactose linked by α-glycosidic bonds. The same "soymilk cream" and oligosaccharide used in the following Examples were used as in this Example.

Comparative Example 2

A mixed liquid was prepared by mixing 54.5 parts of "soymilk cream", 1 part of glucose, 0.6 part of galactose (monosaccharide), and 43.8 parts of water to make 99.9 parts. To the mixed liquid, 0.1 part of the same two lactic acid bacteria as those of Comparative Example 1 was added, and lactic acid fermentation was performed at 42° C. until the pH decreased to 4.6 to obtain a fermented plant-based milk food.

Example 1

A mixed liquid (pH 6.78) was prepared by mixing 54.5 parts of "soymilk cream", 1 part of glucose, 0.8 part of oligosaccharide, and 43.69 parts of water to make 99.9 parts. To the mixed liquid, 0.01 part of lactic acid bacterium (*Lactococcus lactis*) having α-galactosidase activity was added, and lactic acid fermentation was performed at 26° C. for 3 hours. After the fermentation, the mixture was pasteurized at 90° C. for 1 minute to obtain liquid plant-based milk. The obtained liquid plant-based milk had pH 6.76, and pH was decreased by 0.02 from starting the fermentation.

Next, to the liquid plant-based milk, 0.1 part of the same EPS-producing lactic acid bacterium as that of Comparative Example 1 was added, and lactic acid fermentation was performed at 42° C. until the pH decreased to 4.6 to obtain a fermented plant-based milk food.

Example 2

A fermented plant-based milk food product was obtained in the same manner as Example 1, except that an amount of the oligosaccharide was changed to 1.6 parts (double amount in Example 1).

Curds of the fermented plant-based milk foods obtained from Examples 1 and 2 and Comparative Examples 1 and 2 were crushed with a homomixer to form a cream-like shape, and viscosity and stretch of them were measured.

A viscosity was measured with a BM type viscometer using No. 4 rotor at 60 rpm and 10° C. for 200 g of sample poured into a measurement beaker.

A stretch was measured with a rheometer for 100 g of sample poured into a yoghurt cup. Specifically, measurement was carried out by inserting a φ3 cm plunger into the sample, pulling out the yogurt cup from the plunger at a speed of 6 cm/min, stopping the movement when a connection between the plunger and the sample is cut, and measuring a distance from the top surface of the sample to the plunger.

TABLE 1

| | Comparative Example 1 | Comparative Example 2 | Example 1 | Example 2 |
|---|---|---|---|---|
| Viscosity (mPa · s) | 4050 | 4100 | 4900 | 4500 |
| Height (cm) | 1.2 | 1.5 | 1.7 | 1.6 |

Examples 1 and 2 were thickened more than Comparative Examples 1 and 2 and showed viscosity and stretch equal to or higher than those of Comparative Example 2 containing galactose. In addition, Examples 1 and 2 had a smooth and creamy texture compared to Comparative Examples 1 and 2.

Example 3

A mixed liquid was prepared by mixing 54.5 parts of "soymilk cream", 1 part of glucose, 0.8 part of oligosaccharide, and 43.69 parts of water to make 99.9 parts. To the mixed liquid, 0.1 part of enzyme agent of α-galactosidase "α-Galactosidase DS30" (manufactured by Amano Enzyme Inc., activity: 50,000 GalU/g or more) was added, and hydrolysis treatment was performed at 60° C. for 1 hour. After the hydrolysis treatment, the mixture was pasteurized at 90° C. for 1 minute to obtain liquid plant-based milk.

Next, to the liquid plant-based milk, 0.1 part of the same EPS-producing lactic acid bacterium as that of Comparative Example 1 was added, and lactic acid fermentation was performed at 42° C. until the pH decreased to 4.6 to obtain a fermented plant-based milk food.

TABLE 2

|  | Comparative Example 2 | Example 3 |
| --- | --- | --- |
| Viscosity (mPa · s) | 4100 | 4500 |
| Height (cm) | 1.5 | 1.6 |

Example 3 showed viscosity and stretch equal to or higher than those of Comparative Example 2 containing galactose. In addition, Example 3 had a smooth and creamy texture similar to Examples 1 and 2.

Example 4

A mixed liquid was prepared by mixing 54.5 parts of "soymilk cream", 1 part of glucose, 0.8 part of oligosaccharide, and 43.69 parts of water to make 99.9 parts. To the mixed liquid, 0.1 part of same α-galactosidase as that of Example 3 and 0.1 part of the same EPS-producing lactic acid bacterium as that of Comparative Example 1 were added, and lactic acid fermentation was performed at 42° C. until the pH decreased to 4.6 to obtain a fermented plant-based milk food.

TABLE 3

|  | Comparative Example 2 | Example 4 |
| --- | --- | --- |
| Viscosity (mPa · s) | 4100 | 4600 |
| Height (cm) | 1.5 | 1.5 |

Example 4 showed viscosity and stretch equal to or higher than those of Comparative Example 2 containing galactose. In addition, Example 4 had a smooth and creamy texture similar to Examples 1, 2, and 3.

Example 5

A fermented plant-based milk food product was obtained in the same manner as Example 1, except that "soymilk cream" was substituted to almond milk (manufactured by Tsukuba Dairy Products Co., Ltd., total solid content: 9.9%, protein content: 2.9%, lipid content: 5.6%). The obtained fermented plant-based milk food showed viscosity and stretch equal to those of Example 1, and had a smooth and creamy texture.

(Example 6) Application to Plant-Based Butter

A mixed liquid (pH 6.82) was prepared by mixing 98.19 parts of "soymilk cream", 1 part of glucose, and 0.8 part of oligosaccharide to make 99.9 parts. To the mixed liquid, 0.01 part of lactic acid bacterium (*Lactococcus lactis*) having α-galactosidase activity was added, and lactic acid fermentation was performed at 26° C. for 3 hours. After the fermentation, the mixture was pasteurized at 90° C. for 1 minute to obtain liquid plant-based milk. The obtained liquid plant-based milk had pH 6.79, and pH was decreased by 0.03 from starting the fermentation.

Next, to the liquid plant-based milk, 0.1 part of the same EPS-producing lactic acid bacterium as that of Comparative Example 1 was added, and lactic acid fermentation was performed at 42° C. until the pH decreased to 4.6 to obtain a fermented plant-based milk food.

An aqueous phase was prepared by adding 2.4 parts of salt to 300 parts of the obtained fermented plant-based milk food (liquid temperature: 40° C.). An emulsion liquid was prepared by gradually adding 450 parts of coconut oil having 25° C. of slip melting point, which was heated to 40° C. and melted, to the aqueous phase while stirring.

The obtained emulsion liquid was cooled overnight in a refrigerator at 4° C. to obtain a plant-based butter. The obtained plant-based butter was very creamy.

The invention claimed is:

1. A method for producing a fermented plant-based milk food comprising inoculating a lactic acid bacterium into a fermentation raw material containing a plant-based milk and subjecting the plant-based milk to lactic acid fermentation, the method comprising:
   (A) a decomposition step comprising adding a sugar containing galactose bound with an α-glycosidic bond as a constituent sugar to a plant-based milk and hydrolyzing the sugar in the plant-based milk by activating a α-galactosidase on the plant-based milk to obtain a hydrolyzed plant-based milk; and
   (B) a fermentation step comprising fermenting the hydrolyzed plant-based milk with a lactic acid bacterium having extracellular polysaccharide-producing ability after the decomposition step or together with the decomposition step.

2. The method for producing a fermented plant-based milk food according to claim 1, wherein the decomposition step is performed by fermentation with a microorganism having α-galactosidase activity.

3. The method for producing a fermented plant-based milk food according to claim 1, wherein the decomposition step is performed with an enzyme having α-galactosidase activity.

4. The method for producing a fermented plant-based milk food according to claim 1, further comprising a pasteurization step prior to the fermentation step (B) and after the decomposition step (A).

5. The method for producing a fermented plant-based milk food according to claim 1, wherein the sugar containing galactose as a constituent sugar is raffinose or stachyose.

6. The method for producing a fermented plant-based milk food according to claim 1, wherein the plant-based milk is a bean milk.

7. A method for producing a plant-based milk for a fermentation raw material using a lactic acid bacterium having an extracellular polysaccharide-producing ability, the method comprising:
   adding a sugar containing galactose bound with an α-glycosidic bond as a constituent sugar to a plant-based milk and hydrolyzing the sugar in the plant-based milk with α-galactosidase by activating a α-galactosidase on the plant-based milk, and then subjecting the plant-based milk to a pasteurization.

8. The method according to claim 7, wherein the hydrolysis is performed by fermentation with a microorganism having α-galactosidase activity.

9. The method according to claim 7, wherein the hydrolysis is performed by treating with an enzyme having α-galactosidase activity.

10. The method for producing a plant-based milk according to claim 7, wherein the sugar containing galactose as a constituent sugar is raffinose or stachyose.

11. The method for producing a plant-based milk according to claim 7, wherein the plant-based milk is a bean milk.

12. The method for producing a fermented plant-based milk food according to claim 1, wherein the plant-based milk in the decomposition step comprises 0.1 to 10% by weight of sugar after adding the sugar containing galactose bound with an α-glycosidic bond as a constituent sugar.

13. The method for producing a fermented plant-based milk food according to claim 7, wherein the plant-based milk comprises 0.1 to 10% by weight of sugar after adding the sugar containing galactose bound with an α-glycosidic bond as a constituent sugar.

14. The method for producing a fermented plant-based milk food according to claim 1, wherein the lactic acid bacterium does not have α-galactosidase activity.

15. The method for producing a fermented plant-based milk food according to claim 7, wherein the lactic acid bacterium does not have α-galactosidase activity.

* * * * *